United States Patent [19]

Thorne

[11] Patent Number: 4,579,055

[45] Date of Patent: Apr. 1, 1986

[54] PRINTER HAVING DRIVE AND CONTROL SYSTEM FOR METAL BAND HOLDING PRINT ELEMENTS

[75] Inventor: William D. Thorne, Charlotte, N.C.

[73] Assignee: IBM Corporation, Armonk, N.Y.

[21] Appl. No.: 626,516

[22] Filed: Jun. 29, 1984

[51] Int. Cl.[4] .................................................. B41J 1/20
[52] U.S. Cl. .................................... 101/93.14; 400/146
[58] Field of Search ...................... 400/146; 101/93.04, 101/93.13, 93.14, 382 MV

[56] References Cited

U.S. PATENT DOCUMENTS

| | | | |
|---|---|---|---|
| 3,283,711 | 11/1966 | Lew | 101/283 X |
| 3,379,125 | 4/1968 | Antonucci | 101/93.14 |
| 3,435,756 | 4/1969 | Martin | 101/382 MV |
| 3,766,852 | 10/1973 | De Puy et al. | 101/93.13 |
| 3,845,711 | 11/1974 | Helms | 101/93.14 X |
| 4,428,285 | 1/1984 | Cole et al. | 101/93.04 |

FOREIGN PATENT DOCUMENTS

| | | |
|---|---|---|
| 0036970 | 10/1981 | European Pat. Off. . |
| 2003895 | 1/1980 | Fed. Rep. of Germany . |
| 38147 | 3/1982 | Japan .................................. 400/146 |
| 1493719 | 11/1977 | United Kingdom . |

OTHER PUBLICATIONS

IBM Technical Disclosure Bulletin, vol. 23, No. 6, Nov. 1980, pp. 2430-2431, "Magnetic Print Belt Drive Mechanism", by Keplar et al.

Machinery's Handbook: Industrial Press, NY, NY 1978, by Oberg et al., p. 2229.

Primary Examiner—Charles A. Pearson
Attorney, Agent, or Firm—E. R. Coffman

[57] ABSTRACT

A printer of the type including a platen, a bank of hammers extending in a straight line along and spaced from the platen and a continuous metal band of magnetizable material on which are mounted a plurality of print elements is provided with drive means for moving the band between the platen and the hammer bank and control means for controlling the movement of the band so that the print elements on the band move along the line of hammers. The band drive means includes a drive wheel located near one end of the hammer bank and means for forcing the band into close contact with the peripheral surface of the drive wheel. The means for forcing the band into close contact with the peripheral surface of the drive wheel can be a permanent magnet member located on the surface of the drive wheel. The band movement control means includes guide means for guiding the band so that it extends along the hammer bank and permanent magnet means adapted to force the band into close contact with the guide means. The guide means can be a fixed guide member located near the end of the hammer bank remote from the drive wheel and the permanent magnet means can be a permanent magnet member located on the surface of the guide member and adapted to attract the band to the guide member.

1 Claim, 9 Drawing Figures

PRINTER HAVING DRIVE AND CONTROL SYSTEM FOR METAL BAND HOLDING PRINT ELEMENTS

FIELD OF THE INVENTION

The present invention relates to printers of the kind which have a flexible metal band on which print elements are mounted and to systems for driving and controlling bands of this kind.

BACKGROUND OF THE INVENTION

In one known kind of printer, adapted to print on a print medium as it passes over a platen using a plurality of print elements operated selectively by hammers, the print elements are mounted on flexible fingers forming part of a metal band in the form of a continuous loop, one print element being mounted on each flexible finger. The print elements extend in a straight line along the band parallel to the longitudinal center line of the band. A bank of hammers extends along the platen and is spaced from the platen so as to define a print region between the hammer bank and the platen. The print medium extends through the print region across the platen so that the hammer bank extends across the width of the print medium. The metal band on which the print elements are mounted also extends through the print region along the platen and across the width of the print medium and is located between the hammer bank and the print medium. An ink ribbon also is located in the print region between the metal band and the print medium.

The metal band is driven continuously along the platen past the hammer bank and across the print medium by a suitable drive system. Operation of any one of the hammers of the bank causes the hammer to move towards the metal band and to abut against one of the print elements so as to move this print element on its flexible finger towards the ink ribbon and the print medium. The print element in moving abuts against the ink ribbon and forces the ink ribbon into contact with the print medium causing the printing of a mark on the print medium of the shape of the print element.

According to one particular printer of the above kind and illustrated by way of example in U.S. Pat. No. 4,428,284, each of the print elements is shaped like a dot and operation of each hammer causes the printing of a dot on the print medium. As the metal band moves continuously across the print medium operation of selected hammers will result in the printing of a line of dots in positions on the print medium corresponding to the positions of the hammers which are operated. Each hammer is formed with a head which has a width in the direction of movement of the band which is greater then the width of a single dot. It is therefore possible for each hammer to print a dot in any position on the print medium which is covered by the hammer by varying the timing of the operation of the hammer relative to the movement of the band. As a result each hammer can print a dot in a number of positions on the print medium. Therefore, the dots in the line printed can occupy many selected positions on the print medium. There is only a small gap between each pair of adjacent hammers and the hammers can print dots at all required positions along the line printed.

After one line of dots has been printed the print medium can be moved through a small increment transversely to the length of the platen and the operation can be repeated resulting in the printing of a second line of dots below the first line of dots. By repeating these operations lines of dots can be printed as required.

A character can be printed on the medium by printing dots in selected positions in a matrix, for example a matrix of 5 columns and 7 rows. By printing dots in selected positions in the lines as described above, characters can be printed in selected positions on the medium. In order for the characters to be printed correctly it is essential that the positions of the dots should be defined accurately. For this to happen it is essential that the metal band should move accurately relative to the platen and the bank of hammers so that the positions of the print elements can be accurately determined. It is therefore necessary to provide a suitable means for driving the band along the platen through the print region and to control the band as it is driven.

It is known to drive the metal band by passing the band around the periphery of a single drive wheel located at one end of the hammer bank and to rotate the drive wheel by means of a suitable motor and thereby draw the band along the hammer bank towards the drive wheel. The band as it moves past the hammer bank will abut against and be guided by the hammer bank. Since the band is continuous in the form of a loop and has an inherent stiffness it will extend along the hammer bank from the end of the hammer bank at which the drive wheel is located to the other end of the hammer bank and will curve back on itself so that it extends back to the drive wheel without any further guiding means at the other end of the hammer bank. The band can be pressed against the surface of the drive wheel by means of a roller on the end of a pivoting arm which is biased towards the drive wheel. Such an arrangement is described in the above mentioned United States Patent.

It is essential that the band moves evenly along the platen past the hammer bank. The contact between the band and the periphery of the drive wheel must be good so that the driving force provided by the rotation of the drive wheel is evenly imparted to the band. However, the frictional force exerted on the band by the roller pressing the band against the periphery of the drive wheel is not always satisfactory for this purpose. It is known to provide a drive wheel of the above type with a permanent magnet which attracts the band as it passes around the periphery of the wheel as an alternative to using the roller pressing the band against the periphery of the wheel.

As an alternative to using only a single drive wheel for the band it is possible to provide in addition a freely rotating idler wheel at the end of the hammer bank remote from the drive wheel and to curve the band around the periphery of this idler wheel. By suitably positioning this idler wheel a tension can be exerted in the band. However it is essential that the axes of the drive wheel and the idler wheel should be accurately aligned in order to ensure that the band moves accurately and evenly past the hammer bank and to prevent stresses being exerted in the band and this alignment is not always easy to achieve.

It is also essential that the band be prevented from flexing laterally so that it remains flat as it moves along the platen past the hammer bank. Without any additional guiding means located at the end of the hammer bank remote from the drive wheel there is no tension on the band and as a result the band tends to flex as it moves. It is known to guide the band as it passes along the hammer bank by suitable guide rollers located at the lower edge of the band and against which the band is pressed by means of a suitable arm forcing the band downwards towards the rollers. This reduces the tendency of the band to flex laterally. However with such an arrangement if the force is great enough to ensure good contact between the band and the rollers in order to reduce the tendency to flex laterally there is a possibility that the band will buckle. This will result in uneven movement of the band.

It is also known to use permanent magnets to control other kinds of print element holders as they are moved relative to hammers, for example those kinds in which the print elements are connected together to form a chain. By way of example such an arrangement is described in U.S. Pat. No. 3,435,756.

The object of the present invention is to provide a printer of the type including a hammer bank and a metal band on which are mounted print elements having improved driving means for moving the band past the hammer bank and improved control means for controlling this movement.

A further object of the invention is to ensure that the driving force is fully and evenly imparted to the band so that the movement of the band is even.

A still further object of the invention is to provide control means which ensures that the print elements on the band, as the band passes the hammer bank, are correctly aligned with the hammers over the whole length of the hammer bank.

SUMMARY OF THE INVENTION

A drive means for the metal print element band of a printer of the above type includes a drive wheel located near one end of the hammer bank of the printer, means for rotating the drive wheel and means for forcing the band into close contact with the surface of the drive wheel so as to ensure that the driving force from the drive wheel is fully imparted to the band. The means for forcing the band into close contact with the surface of the drive wheel can be a permanent magnet member located on the surface of the drive wheel so as to attract the band to the wheel.

A control means for controlling the movement of the metal print element band of the printer includes a guide means for guiding the band so that it extends along the hammer bank. Permanent magnet means, which may comprise a permanent magnet member located on the guide means, forces the band into close contact with the surface of the guide means so that the band is guided accurately by the guide means. The guide means may include a fixed guide member located at the end of the hammer bank remote from the drive wheel with a permanent magnet member on the surface of the guide member. The band is attracted by the permanent magnet member to the surface of the guide member. As a result the band is accurately guided by the guide member and a drag force is exerted on the band tending to tension the band. Consequentially the band is under tension as it moves past the hammer bank and therefore moves accurately in a straight line. As a result the print elements on the band are accurately aligned with the hammers along the whole length of the hammer bank.

The guide means may also include one or more bearing members located adjacent to the hammer bank together with permanent magnet members which attract one edge of the band against the bearing members thereby ensuring the the band is guided accurately by the bearing members.

BRIEF DESCRIPTION OF THE DRAWINGS

These and other objects, features and advantages of the invention will be more fully understood by those working in the art by reading and understanding the following description of a preferred embodiment of the invention, wherein reference is made to the accompanying drawings of which.

DETAILED DESCRIPTION OF THE INVENTION

Figure 1:
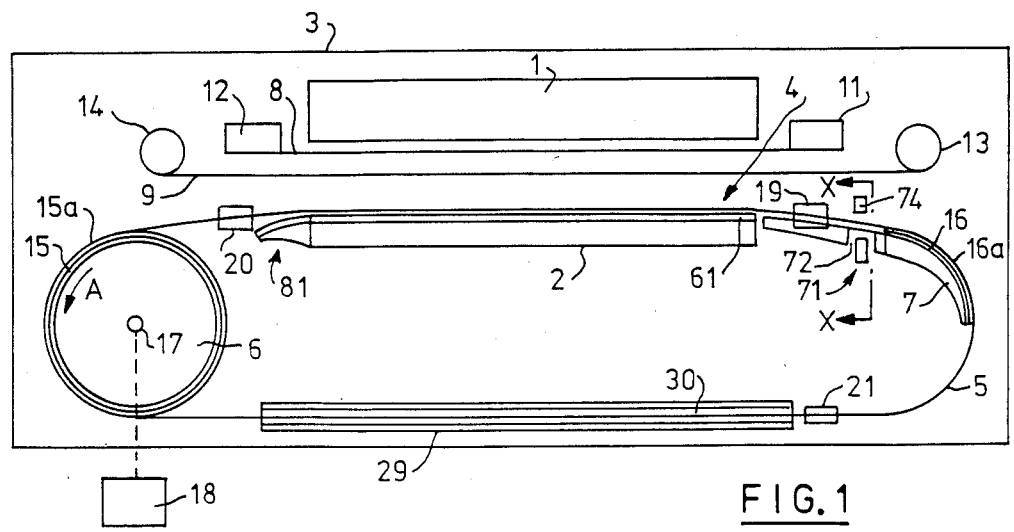
FIG. 1 is a diagrammatic plan view of a printer embodying the invention and including a metal band on which are mounted print elements.

Referring to FIG. 1, the printer includes a platen 1 and a bank of hammers 2 mounted on the frame of the printer (represented diagrammatically at 3) and defining a print region 4 which extends between the platen and the hammer bank. A flexible metal band 5 in the form of a continuous loop and on which are mounted print elements is driven through the print region 4. The metal band 5 is made of a magnetizable material, for example magnetizable stainless steel and can be the material known by the Trade Name Carpenter Custom #455. The band 5 has a thickness of about 4/1000 inch (0.1 millimeters) and a width of about 1½ inches (4.00 millimeters). The metal band 5 passes around the periphery of a drive wheel 6 located at one end of the print region and around a fixed guide member 7 located at the other end of the print region.

A print medium 8 and an ink ribbon 9 extend between the platen 1 and the metal band 5. The print medium 8, which may be a continuous paper web, is driven over the surface of the platen 1 in a transverse direction intermittently by a print medium drive means illustrated diagrammatically at 11,12 in order to bring selected parts of the print medium into the print region. The ink ribbon 9 is driven continuously along the length of the platen 1 through the print region 4 between the band 5 and the medium 8 by a ribbon drive means illustrated diagrammatically at 13,14. The print medium drive means 11,12 and the ribbon drive means 13,14 are not described in detail because they do not form part of the invention.

On the periphery of the drive wheel 6 is formed a layer 15 of permanent magnet material covered with a layer 15a of polyurethane having a thickness of about 2/1000 inch (0.05 millimeters) and on the periphery of the guide member 7 is formed a similar layer 16 of permanent magnet material covered with a layer 16a of wear resisting material such as high molecular weight polyethylene. The permanent magnet layer 15 attracts the metal band 5 to the surface of the wheel 6 and the permanent magnet layer 16 attracts the metal band 5 to the surface of the guide member 7.

The drive wheel 6 is mounted on a shaft 17 which is rotated at a constant speed by a suitable motor 18 so that the drive wheel 6 rotates in an anticlockwise direction as seen in FIG. 1 as indicated by the arrow A. The attraction of the band 5 to the permanent magnet layer 15 and the relatively high friction contact provided by the polyurethane layer 15a over the permanent magnet layer ensures that the driving force provided by the driving wheel 6 is fully imparted to the band so that the band will be pulled evenly through the print region 4 between the platen 1 and the hammer mechanism 2. The attraction of the band 5 to the permanent magnet layer 16 causes a dragging or retarding force to be exerted on the band. This results in the band being tensioned and ensures that the band is flat as it passes through the print region 4. This dragging or retarding force will be controlled by the relatively low friction contact provided by the layer 16a of polyethylene over the permanent magnet layer 16.

The printer also includes three bearing members 19, 20, 21 for the band 5. These bearing members are located respectively at the two ends of the print region and in the region of the path of the band from the drive member 6 to the guide member 7 and serve to support the lower edge of the band 5. One of these bearing members 19 is illustrated more clearly in FIG. 2. The bearing member 19 comprises a roller 23 mounted on an axle 24 the two ends of which are supported in two side members 25 of a non-magnetizable material such as aluminum so that the axle 24 extends in a direction perpendicular to the plane of the metal band 5. These side members 25 are attached to a base member 26 of a magnetizable material such as iron. At each end of the base member 26 is located a permanent magnet member 27. These permanent magnet members 27 are magnetized so that they have poles on their ends and are positioned in the bearing member as illustrated so that one has a North pole at its upper end and the other has a South pole at its upper end. As a result a flux path is created which extends from one magnet 27, through the base member 26, through the other magnet 27 and across the gap between the upper pole faces of the magnets. The lower edge 28 of the band 5 is supported on the roller 23 so that the upper part of this flux path passes through the band. As a result the band is strongly attracted towards the roller 23 by the action of the permanent magnet members 27. The peripheral bearing surface of the roller 23 extends parallel to the axle 24 and perpendicular to the plane of the band 5.

A further guide 29 is provided for the band in the region of the path between the drive wheel 6 and the guide member 7. This consists of a channel member made of a suitable low friction material such as polyethylene and formed with a U-shaped channel 30 of width slightly greater then the thickness of the band 5. The lower edge 28 of the band 5 extends along the U-shaped channel 30.

Figure 2:
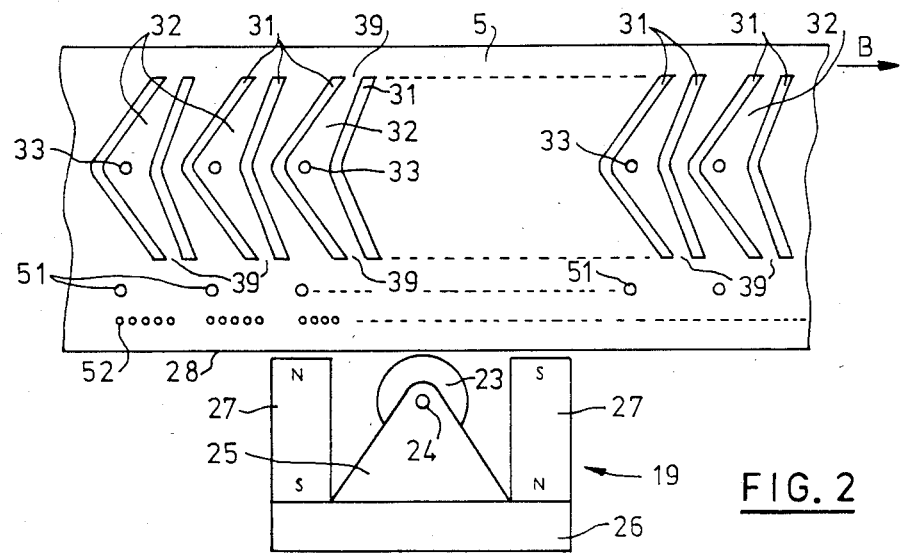
FIG. 2 is a view on a larger scale of the metal band and one of several bearing members supporting and controlling the metal band in the printer of FIG. 1.
Figure 3:
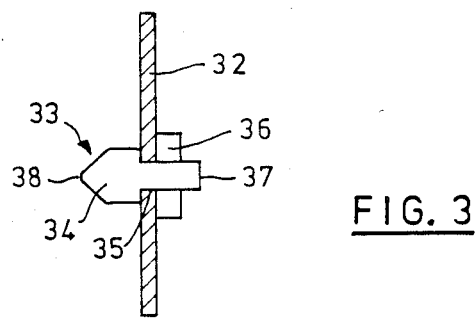
FIG. 3 is a cross section view of part of the metal band sectioned at the position of one of the print elements.

FIG. 2 also illustrates the band 5 more clearly and is a view of the band from the platen 1. The arrow B indicates the direction of movement of the band. The band 5, as described above, is made from a thin magnetizable material and has holes 31 punched in it to form a plurality of chevron shaped fingers 32. At the apex of each chevron shaped finger 32 is attached a print element 33 made from stainless steel. As illustrated in FIG. 3 each print element 33 consists of a body portion 34 which projects through a suitable hole 35 formed in the finger 32. The body portion 34 is retained in the hole by a suitable collar 36 which is swaged in position. One end of the print element 33 is formed with a relatively large head 37 and the other end of the print element 33 is formed with a relatively small head 38. The element 33 is mounted in the band 5 so that the larger head 37 is on the inside of the loop of the band and is therefore adapted to be struck by a hammer of the hammer mechanism 2 and the smaller head 38 is on the outside of the loop of the band and is adapted to strike the ink ribbon 9 and cause a mark to be printed on the print medium 8 during operation of the printer. The smaller head 38 is shaped as a round dot so that in operation each print element will cause a small dot to be printed on the print medium 8. Each of the fingers 32 is attached at its two ends 39 to the band 5. The rest of each finger is spaced from the band by the holes 31.

Figure 4:
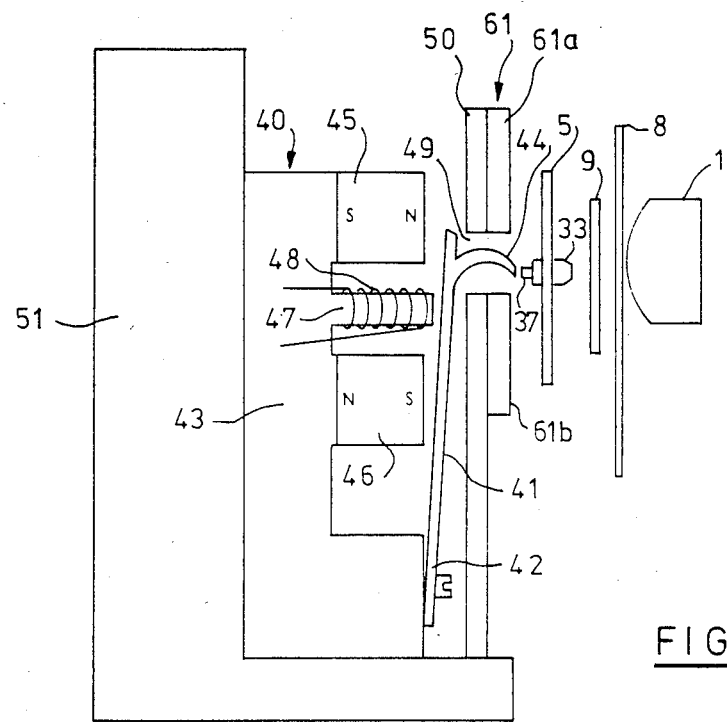
FIG. 4 is a side view of one of the hammers of a hammer bank in the printer of FIG. 1.

The hammer bank 2 consists of a plurality of hammers 40 which can be of the type described in general terms in U.S. Pat. No. 4,428,284 and as illustrated in FIG. 4. Each hammer 40 consists of a resilient flexible arm 41 attached at one end 42 to a hammer frame member 43 and formed at its other end with a hammer head 44. On the frame member 43 are mounted two permanent magnets 45, 46 and a pole piece 47 which produce a magnetic flux. This flux attracts the free end of the flexible arm 41 into a cocked position in which the arm rests against the pole piece 47 and is resiliently biased away from this cocked position by its natural resilience. A coil 48 surrounds the pole piece 47. When the coil 48 is energized it produces another magnetic flux which overcomes the magnetic flux produced by the permanent magnets 45, 46 and the pole piece 47 and releases the flexible arm 41 from its cocked position. The arm 41 moves away from the frame 43 and the hammer head 44 on the free end of the arm 41 projects through a gap 49 in a guide member 50 attached to the hammer bank 2 and strikes the larger head 37 of a print element 33 which is in position adjacent to the hammer, as will be described in more detail below. The larger head 37 of the print element 33 and the hammer head 44 on the flexible arm 41 are each made of a suitable material to be able to withstand the repeated impacts that occur during operation of the printer.

The hammers 40 are mounted on a common frame 51 which extends along the platen 1 and all the hammer heads 44 are aligned on a line extending along the platen. The frame 51 supports the guide member 50 and also includes connections to drive circuits for the coils 48 of the hammers which are located elsewhere in the printer. The operation of the hammers is described in detail in U.S. Pat. No. 4,428,284 and will not be described in detail here since it does not form part of the invention.

The shape of each finger 32 on the band 5 is chosen so that each finger has the required flexibility to ensure that when each print element 33 is struck by a hammer head 44 it moves accurately at right angles to the band and strikes the ink ribbon cleanly. The fingers 32 normally lie in the plane of the band 5. If a print element 33 is struck by a hammer head 44 in the hammer bank 2 the element 33 and the associated finger 32 will move out of the plane of the band in order to move into contact with the ink ribbon. All the elements 33 are aligned on a line extending along the length of the band 5 and parallel to the line of the hammer heads 44.

As illustrated in FIG. 2, adjacent to the lower edge 28 of the band 5 and extending along the length of the band are formed two sets of holes. The upper set consists of a plurality of holes 51 each of which corresponds to one of the fingers 32 so that the holes of this set extend along the band at the same distance apart as the distance between adjacent print elements 33. The lower set of holes consists of a plurality of holes 52 spaced apart by a distance of approximately 1/50 inch (0.5 millimeters). A group of 18 holes 52 is provided for each of the upper holes 51. These two sets of holes are used for controlling the operation of the hammers 40 as described below.

Figure 5:
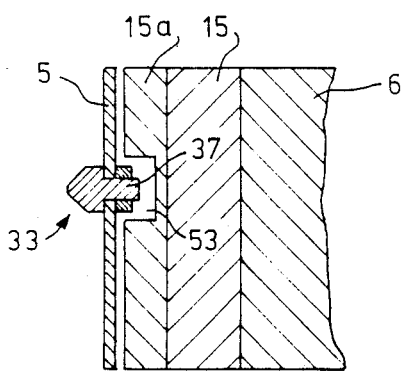
FIG. 5 is a view in cross section of the outer edge of a drive wheel used to drive the metal band in the printer of FIG. 1.

The larger heads 37 of the print elements 33 project from the inside of the band 5. The band passes around the periphery of the drive wheel 6 and over the surface of the guide member 7. As described above the surfaces of the drive wheel 6 and the guide member 7 are formed with permanent magnet layers 15, 16 respectively covered with outer layers 15a, 16a respectively. These layers must be formed with a channel at least as wide and as deep as the width and height of the larger head 37 of each print element 33 in order to accommodate these larger heads and to allow the band to lie in close contact with the surfaces of the outer layers of the drive wheel 6 and the guide member 7. FIG. 5 illustrates this central channel 53 in the layers 15, 15a covering the surfaces of the drive wheel 6 and how it accommodates the larger head 37 of a print element 33. It will be appreciated that the layers over the guide member 7 are formed with a similar channel 53.

The action of the permanent magnet layer 15 on the surface of the drive wheel 6 ensures close contact between the band 5 and the drive wheel so that the band moves in synchronism with the rotation of the drive wheel without any slip. The action of the permanent magnet layer 16 on the surface of the guide member 7 increases the frictional force between the band 5 and the guide member 7. This results in the exertion of a dragging or retarding force on the band which tensions the band as it moves and tends to ensure that the band is flat as it passes along the platen through the print region of the printer past the hammer bank 2. This dragging force on its own is not always adequate to ensure that the band 5 is flat as it passes the hammer bank 2 and in order to provide another force to keep the band flat the printer includes another permanent magnet device 61 which extends along the surface of the guide member 50 of the hammer bank 2 adjacent to the band 5.

Figure 6:
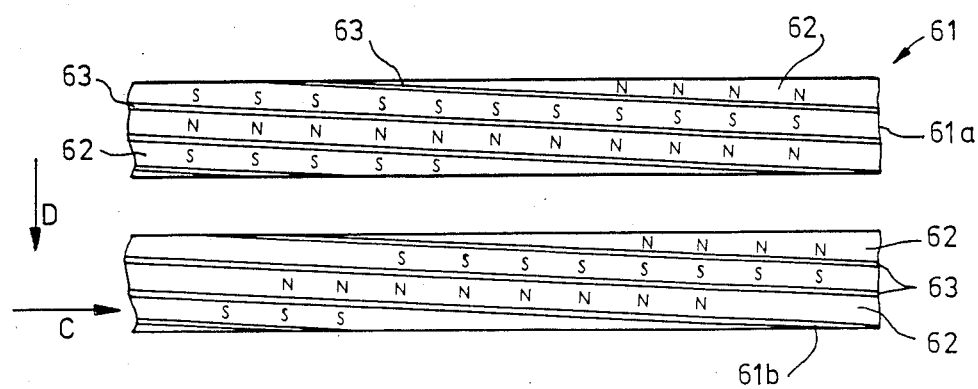
FIG. 6 is a view of a permanent magnet member controlling the metal band of the printer of FIG. 1.
Figure 7:
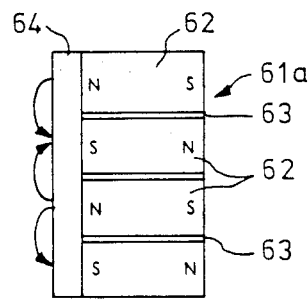
FIG. 7 is an end view in cross section of the permanent magnet member illustrated in FIG. 6.

This permanent magnet device 61 is illustrated in FIGS. 4, 6 and 7. As will be seen in FIG. 6 the device 61 is formed from two identical members 61a, 61b which extend respectively one on each side of the gap 49 in the guide member 50. Each member 61a, 61b consists of a plurality of strips 62 of permanent magnet material placed side by side and separated by strips 63 of non-magnetic material. Each permanent magnet strip 62 is magnetized so that one surface exhibits a North pole along its full length and the other surface exhibits a South pole along its full length. The strips 62, 63 are assembled together so that adjacent permanent magnet strips on each side of each of the members 61a, 61b exhibit different poles as illustrated in FIG. 6. The permanent magnet strips 62 are all the same width with opposite sides being parallel and the non-magnetic strips 63 are also all the same width with opposite sides being parallel so that the permanent magnet strips 62 extend parallel along the length of each member 61a, 61b. Flux paths are formed as indicated in FIG. 7 extending from the surface of each strip 62 to the surface of each adjacent strip 62 exhibiting the opposite polarity. One surface of each of the members 61a, 61b is covered with an outer wear resisting protective layer 64 of high molecular weight polyethylene. The thickness of each permanent magnet member 61a, 61b is of the order of 1.25 millimeters and the thickness of each outer protective layer 64 is of the order of 0.6 millimeters.

The members 61a, 61b are attached by any suitable means, for example an adhesive, to the surface of the guide member 50 which is adjacent the band 5 so that the outer layer 64 of each member faces the metal band 5. The members 61a, 61b are oriented on the guide member 50 so that the strips of permanent magnet material 62 extend at an angle to the direction of movement of the band 5 past the hammer bank which is represented by the arrow C in FIG. 6. As a result the flux paths between the surfaces of adjacent strips 6 extend at an angle of less than a right angle to the direction of movement of the band 5.

It is found that, as the band 5 moves past the members 61a, 61b in the direction of the arrow C, it experiences a downward force in the direction of the arrow D (FIG. 6) at right angles to its direction of movement as well as a normal sideways force towards the members 61a, 61b. The reason for the occurrence of this downward force is not clearly understood but it is believed to result from the interaction between the edges of the slots 31 in the band 5 and the flux paths between the surfaces of the strips 62 illustrated in FIG. 7. It is found that the downward force is reduced if a band without any slots 31 is moved over the members 61a, 61b and the downward force is completely eliminated if the strips 62 are aligned accurately parallel or perpendicular to the direction of movement of the band 5.

The permanent magnet device 61 serves three purposes. Firstly, the device 61 exerts a force sideways on the band 5 which attracts the band onto the surface of the guide member 50 and therefore ensures that the band is flat as it passes the hammer bank 2. Secondly, the attraction of the band 5 to the guide member 50 causes a dragging or retarding force to be exerted on the band thereby tensioning the band. Thirdly, the device 61 exerts a force downwards on the band in the direction of the arrow D which tends to press the lower edge 28 of the band into closer contact with the bearing members 19, 20 located at the ends of the hammer bank 2.

Each hammer 40 includes two permanent magnets 45, 46 and these magnets will exert a further sideways force on the band 5 attracting the band towards the guide member 50, supplementing the sideways force exerted by the device 61.

The permanent magnet layer 16 on the surface of the guide member 7 may also be constructed with permanent magnet strips 62 in the same way as device 61. If the magnet strips are arranged in parallel lines which are inclined to the direction of movement of the band 5, a downward force will be exerted on the band as it moves past the guide member 7 and this will further tend to press the edge 28 of the band against the adjacent bearing member 19.

Figure 8:
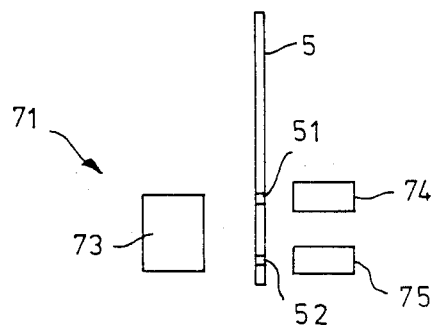
FIG. 8 is a diagrammatic side view of part of the printer of FIG. 1 sectioned at X—X.

In order to provide a means for indicating the position of each of the print elements 33 as the band 5 moves through the print region and to provide signals for controlling the operation of the hammers 40, an emitter device 71 is located in a hole 72 extending within the guide member 7 as illustrated diagrammatically in FIG. 1. The emitter device 71 is illustrated diagrammatically in FIG. 8 and comprises a light source 73 located inside the loop of the band 5 and two light sensors 74, 75 located one above each other outside the loop of the band. The source 73 and the sensors 74, 75 are aligned respectively with the two sets of holes 51, 52 near the lower edge 28 of the band 5 so that light from the source 73 will pass through any hole 51, 52 which is aligned with the source and will be received by the upper sensor 74 if it passes through the one of the upper set of holes 51 and by the lower sensor 75 if it passes through one of the lower set of holes 52. As the band moves, successive holes 51,52 will allow pulses of light to be received by the sensors 74, 75 which will produce corresponding electrical pulses. These electrical pulses can be used as timing pulses to control the operation of the hammers 40.

Figure 9:
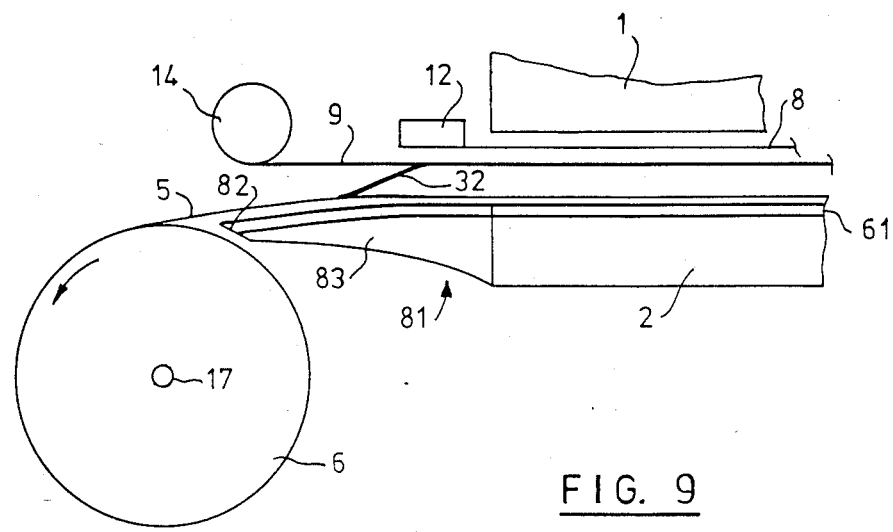
FIG. 9 is a view on a larger scale of a permanent magnet device also used to control the metal band.

When any one of the fingers 32 on the band 5 is moved towards the ink ribbon 9 by the action of one of the hammer heads 44 striking the print element 33 on that finger during the operation of the printer there is a possibility that the ink ribbon 9 will remain in contact with the finger 32. As a result, when the finger 32 moves back into the plane of the band 5 it may move the ribbon towards the band. FIG. 9 illustrates a further device 81 which is used to ensure that the ink ribbon 9 does not continue to adhere to the fingers 32 as the band 5 starts to pass onto the surface of the drive wheel 6. The device 81 comprises a permanent magnet member 82 mounted on an extension piece 83 attached to the end of the hammer bank 2. The surface of the permanent magnet member 82 is located adjacent to the inner surface of the band 5. The permanent magnet member 82 attracts the fingers 32 out of the plane of the band 5 onto the side of the band remote from the ink ribbon 9 so that if the ribbon is attached to any finger 32 it will abut against the surface of the band 5 and be removed from the finger and will return to its normal position. This ensures that the ink ribbon 9 does not remain adhering to the band 5 as the band starts to move round the drive wheel 6. The permanent magnet member 82 can be an extension of the permanent magnet member 61 and needs to be formed with a channel similar to the channel 53 in the surface of the permanent magnet layer 15 on the surface of the drive wheel 6 (see FIG. 5). The outer surface of the member 82 can be covered with a layer of high molecular weight polyethylene.

In operation the printer is provided with printing data to control the printing of characters on the print medium 8. The band 5 is driven and controlled by the mechanism described so that it moves evenly through the print region 4. The emitter device 71 produces two set of timing pulses in synchronism with the movement of the band 5, one set being used to indicate the positions of the print elements 33 relative to the hammers 40 and the other set being used to control the operation of the hammers. Printing takes place by selected hammer heads 44 in the hammer bank 2 moving through the gap 45 in the guide member 50 into contact with selected print elements 33. These elements abut against the ribbon 9 and press the ribbon 9 into contact with the print medium 8 resulting in the printing of dots on the print medium 8 along the line of the hammer heads 44. By suitably moving the print medium 8 and operating the hammers 40 dots will be printed in the correct matrix positions to result in the printing of characters on the medium 8. Full details of the print operation of the printer will not be included here because they do not form part of the invention.

The permanent magnet layer 15 on the surface of the drive wheel 6, the permanent magnet layer 16 on the surface of the guide member 7, the permanent magnets 27 in the bearing members 19, 20, 21, the permanent magnet device 61 on the surface of the guide member 50 on the frame of the hammer bank 2 and the permanent magnet member 82 all combine to provide a drive and control system for the band 5 which tends to ensure that the band is driven evenly through the print region 4 of the printer past the hammer bank 2 and is in the correct position relative to the hammer bank 2 as it moves through the print region so that the print elements on the band are accurately aligned with the hammers in the hammer bank along the whole length of the hammer bank.

The permanent magnet layer 15 on the surface of the drive wheel 6 ensures that the band 5 remains in close contact with the surface of the drive wheel 6. As a result the driving force exerted by the drive wheel is fully imparted to the band and therefore the band moves evenly.

The permanent magnet layer 16 on the surface of the guide member 7 ensures that the band 5 remains in close contact with the guide member 7. As a result a dragging or retarding force is exerted on the band 5 which tends to tension the band and ensure that the band is flat as it passes the hammer bank. If this layer 16 is constructed in the same way as the permanent magnet device 16 it will also exert a downward force on the band 5 pressing the lower edge 28 of the band against the bearing member 19.

The permanent magnets 27 in the bearing members 19, 20, 21 exert a force on the band which presses the lower edge 28 of the band into close contact with the rollers 23 of the bearing members. As a result the band is correctly aligned transversely relative to the hammer bank 2 as it passes through the print region.

The permanent magnet device 61 on the surface of the guide member 50 on the frame of the hammer bank 2 exerts three forces on the band 5. The first sideways force results in the band 5 being brought into close contact with the guide member 50 and therefore being correctly aligned relative to the hammer bank in one direction as it passes through the print region and causes a second dragging or retarding force to be exerted on the band thereby tensioning the band 5. The third downward force results in the band being forced downward onto the bearing members 19, 20 so that band 5 is aligned correctly relative to the hammer bank in another direction as it passes through the print region.

The permanent magnet member 82 ensures that the ribbon 9 does not remain adhering to the fingers 32. It therefore reduces the possibility of the ribbon being damaged and ensures that the band 5 will pass smoothly to the drive wheel 6.

What we claim is:

1. A printer including
a platen,
a bank of hammers extending in a straight line along said platen and spaced from said platen,
a continuous metal band of magnetizable material, a plurality of print elements each attached to said band, a drive wheel located near one end of said hammer bank, means for rotating said drive wheel, means for forcing said band into close contact with the peripheral surface of said drive wheel so that rotation of said drive wheel causes movement of said band between said platen and said bank of hammers, guide means for guiding said band so that it extends along said hammer bank with said print elements in line with said hammers, permanent magnet means adapted to attract said band into close contact with said guide means for controlling said movement of said band so that said print elements move along said line of hammers, an ink ribbon, means for moving said ink ribbon between said print elements and said platen, means for feeding a print medium selectively between said ink ribbon and said platen, and means for selectively operating said hammers so that each hammer, upon being operated, strikes a selected one of said print elements and moves said selected print element into contact with said ink ribbon causing said ink ribbon to move towards said platen and into contact with a print medium being fed by said print medium feeding means resulting in the printing on said print medium of a mark corresponding to the shape of said selected print element, characterized by the improvement that said guide means comprises at least one roller bearing member having an outer cylindrical surface, and means for rotatably supporting said roller bearing member near the end of said hammer bank remote from said drive wheel so that its axis extends substantially perpendicular to the surface of said guide member, and that said permanent magnet means comprises two elongated permanent magnets magnetized so as to exhibit poles on their end faces, and a base member of magnetizable material for locating said elongated permanent magnets one on each side of the axis of said roller bearing member with the longitudinal axes of said permanent magnets extending substantially parallel to the plane of said metal band and with the end faces of said elongated permanent magnets adjacent to said metal band exhibiting poles of opposite polarity, whereby said permanent magnets attract one edge of said band towards said outer cylindrical surface.

* * * * *